United States Patent [19]
Zeitz

[11] 4,082,435
[45] Apr. 4, 1978

[54] OPTICAL SWITCH
[75] Inventor: Vernon Zeitz, Springfield, Vt.
[73] Assignee: Johnson & Johnson, New Brunswick, N.J.
[21] Appl. No.: 647,285
[22] Filed: Jan. 7, 1976
[51] Int. Cl.² .................. G05D 25/00; G03B 9/36
[52] U.S. Cl. ................................. 350/269; 354/248
[58] Field of Search .......... 350/266, 269, 270, 96 R, 350/96 B; 354/226, 233, 245, 248, 249; 250/232; 356/93–95, 205, 211

[56] References Cited
U.S. PATENT DOCUMENTS

| | | | |
|---|---|---|---|
| 2,687,611 | 8/1954 | Larsen | 250/232 X |
| 2,934,647 | 4/1960 | Blake | 250/232 X |
| 3,166,635 | 1/1965 | Todt | 350/269 X |
| 3,510,206 | 5/1970 | Smith | 350/266 X |

OTHER PUBLICATIONS

Nassimbene, IBM Technical Disclosure Bulletin, vol. 7, No. 1, June 1964, p. 70.
Callahan, IBM Technical Disclosure Bulletin, vol. 12, No. 6, Nov. 1969, p. 854.

Primary Examiner—F. L. Evans

[57] ABSTRACT

A bistable optical switch for use in control of fiber optic light transmission for blocking one path while opening another is provided having at least a single movable member which may be positionable within a guide member for interrupting at least one optical path therethrough. The movement and position of the movable member may be electrically controllable by attracting and repulsing force members while preferably no power is required to maintain a stable position.

7 Claims, 4 Drawing Figures

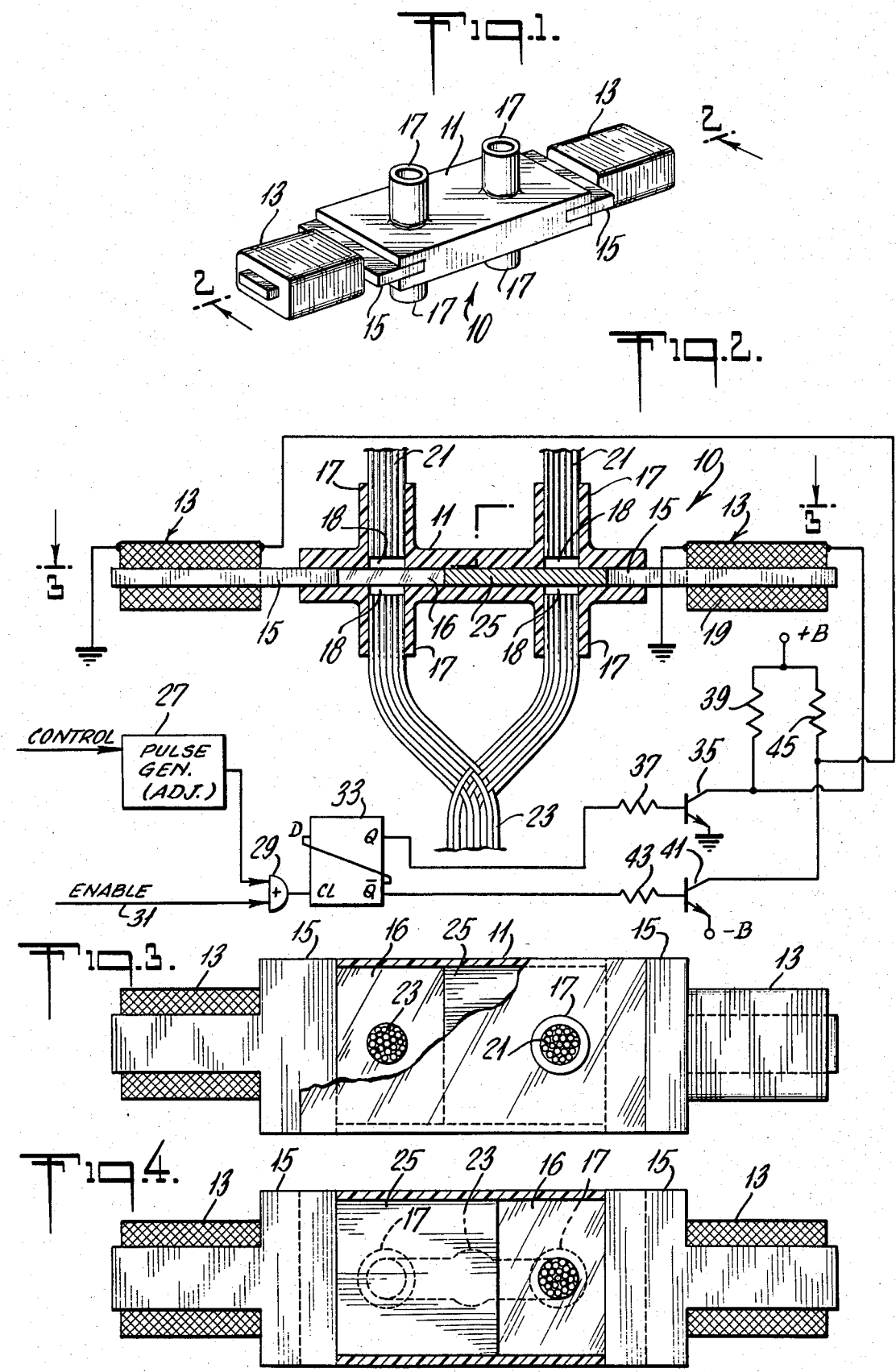

OPTICAL SWITCH

BACKGROUND OF THE INVENTION

The field of optical switching has been established for many years. Incorporated in this field have been inventions used in connection with the printing and automatic control fields as well as the camera or photographic art. What is required in most cases is a controllable or selectable interruption of a light path or part of a light path.

These prior art devices teach the use of electrical circuits incorporating electromagnetic control devices for motivating and/or controlling the position of an opaque, metallic member to interrupt the light path. In many instances, the opaque, metallic member is mechanically biased to a fixed or stable position. The electromagnetic attractive forces induced into the machine overcome this mechanical bias to position the member into or out of the optical path. These devices thusly become quite complicated and intricate to build and are at best monostable in their operation, requiring constant power to maintain the elective control position.

Other devices such as those designed for automatic exposure controls in photographic cameras include photocell controlled multivibrators. These devices are neither capable of completely closing off one light path while opening another light path nor capable of bistable operation. Moreover, these instruments are usually quite delicate. In each instance, the magnetic forces act against a mechanical spring or other biasing member.

One consideration for error that the prior art devices above possess is that they invariably use separate light paths for reference and sample measurement readings. As transmission qualities of each path must deteriorate unequally, an error may be introduced into an instrument due to degradation of the optical paths.

An object of this invention, therefore, is to provide a bistable optical switch.

Another object of this invention is to provide such a switch having distinct and discrete complimentary states similarly to an electrical flip flop.

Another object of this invention is to provide a switch using a common light path for reference and sample instrument readings.

Another object of this invention is to provide such a switch for fiber optic application, wherein the switch may be economically constructed.

A further object of this invention is to provide a switch having as few as a single moving part.

A further object of this invention is to provide a multiposition discrete output optical switch having multiple stable states requiring neither mechanical biasing nor electrical power for maintaining switch states.

SUMMARY OF THE INVENTION

The objectives of this invention are met by an electronically controlled optical switch within a fiber optic light transmission system. An opaque member preferably having magnetic properties may be positioned to move within a length of enclosed channel. This channel member may act as a guide for the operation of the opaque member, and may have a cross section conforming to the cross section of the opaque member. An electromagnetic switch may be situated at either end of the channel member. The operation of these electromagnets may be individually controlled, electronically.

A plurality of transparent windows may exist in the top and bottom walls of the guide channel. These windows are preferably paired to provide a plurality of optical through paths through the channel. Grommets may be situated on the outside of the guide channel walls about each transparent window for connecting a fiber optic to each window.

On one side of the guide channel an individual fiber optic path or column may be connected to each window on that side via its respective grommets. On the other side of the guide channel each window may similarly have a fiber optic column connected to it via its respective grommet, however each of these columns may be enmeshed with every other column from that side to form a single mixed fiber bundle.

Electronic controls which preferably generate electronic pulses may be connected to each magnet for selectively activating the operation of each electromagnet.

DESCRIPTION OF THE DRAWINGS

The novel features of this invention as well as the construction and method of operation will best be understood from the following description taken in connection with accompanying drawings in which like characters refer to like parts, and in which:

FIG. 1 is a perspective view of the mechanical structure of the switch.

FIG. 2 shows vertical cross section through a longitudinal section of the switch as shown in FIG. 1, including in FIG. 2 a schematic of electronic drive circuitry needed to control the operation of the device.

FIG. 3 is a plan view of the mechanical structure showing a partial cutaway.

FIG. 4 is a bottom plan view from the mixed fiber bundle side of the switch showing a partial cutaway.

DETAILED DESCRIPTION OF THE INVENTION

A discrete switch for "on-off" transmission in a light transmission system to satisfy the need for a high frequency of operation, bistable switch is met by the apparatus which is shown in part in FIG. 1 as designed for a fiber optic light transmission system. FIG. 1 shows a perspective view of the mechanical structure of such a switch 10. Mounted at either end of the housing 11 is an electromagnet 13. These magnets 13 are each attached to the housing 11 by means of their respective magnetic cores 15. At least two pairs of fiber optic grommets 17 provide light path connections to the housing 11. Housing 11 contains an elongated airspace 16. This airspace 16 is bounded on four sides by the walls of the housing 11 and on the ends by the cores 15 of the magnets 13.

Housing 11 provides the basic structure, FIG. 2, for connection and support of all of the mechanical parts. This housing is a hollow device, such as an enclosed rectangular channel member, which provides a rectangularly shaped airspace within. Positioned on the top and bottom surfaces of this channel member 11, are a plurality of paired fiber otpic bundle grommets 17. Each grommet 17 is situated about a transparent light transmission window 18 in the wall of the housing 11. These windows 18 are situated through the top and bottom walls of the housing 11 in juxtaposition so as to permit a direct light path through the housing 11 and the airspace 16 therewithin. Situated at either end of the housing 11 is an electromagnet 13 having a core member 15, one side of which, as commented above, acts to form an end of the housing airspace 16. Magnets 13 each have an electrical wire winding 19.

The mechanical structure can be better understood from the cross-sectional view shown in FIG. 2. The switch 10 is connected to two fiber optic paths 21 which are joined to form a single mixed fiber bundle 23. The first of these fiber optic paths 21 is connected to a first grommet 17 on a first side of the housing 11. The second fiber optic path 21 is joined to a second grommet 17 on the same side of the housing 11. Each of the fiber optic paths 21 is discontinued through the housing 11. That is to say, the paths stop at the window 18 and continue at the opposite housing side window 18 transversing the optical airspace 16 path through the housing 11. The two optical paths 21 each continue from the opposite side of the housing 11 by each being connected to the respective grommet 17 on that opposite side and extending therefrom. The fiber optic paths 21 are than interwoven to form the single mixed fiber bundle 23. The switch 10 is intended, therefore, to interrupt one or the other of the two fiber optic paths 21.

The magnet 13 core members 15 are each flat structures of "T"-shape. The crosspart of each "T" member 15 may have a flat rectangular end which forms a respective end of the housing 11. The stem part of the core 15 may be wire wound with insulated electrical wire to form a winding 19.

Operating within the airspace 16 of the housing 11 may be an opaque slug 25. This slug 25 has magnetic properties and is shaped to glide within the housing airspace 16 on a thin film of air.

An electrical control circuit is connected to each magnet coil winding 19 to activate the coil 19, to generate attractive or repulsive forces which act upon the slug 25. Included in this control circuit is an adjustable pulse generator 27 which is automatically or manually controlled to produce pulses of varying frequency. The output of this pulse generator connects to an electronic switch such as AND-gate 29 which is enabled by an enable signal 31. The pulses from generator 27 are gated through to clock a D-type flip flop 33 being connected for alternating operation by shunting the "Q" output to the "D" input. The primary or Q output of this flip flop 33 is connected to the base of an NPN driver transistor 35 via a base resistor 37. The emitter of this transistor 35 is connected to ground, while the collector is connected to one side of one of the coils 19. This collector also connects to a supply voltage via biasing resistor 39. The complementary "Q" output of the flip flop 33 is likewise connected to the base of a second driver transistor 41 via a similar base resistance 43. This transistor 41 is also an NPN type having its emitter connected to negative bias voltage and its collector connected to the same polar end of the second magnets coil 19 as was driven in the instance of the first magnets coil. The second transistor 41 collector also being connected to the bias voltage via a resistor 45. The opposite or unconnected ends of the windings 19 which are each at the same polar end of the windings 19 are each connected to ground.

FIG. 3 shows a partial cutaway view of the top side of the mechanical structure of the switch from FIG. 2, while FIG. 4 shows a cutaway view of the same structure as seen from the opposite side.

The switch 10 can be made of various materials. Housing 11 can be formed of a sandwich structure of plexiglass material. Inserted at either end of the sandwich is the respective "T" cross section of the magnetic cores 15, to form the ends of the sandwich and the spacing between the top sheet and the bottom sheet. The height of the airspace 16 within the housing 11, therefore, is governed by the thickness of the cores 15. These magnetic cores 15 can be made of sheet material such as rolled steel. The slug 25 can be rectangular, having a length dimension great enough to interrupt the near optical path when the slug is in position at an end of the housing. This slug may be made of high permeability magnetic material, such as permaloy, and have a pre-established north pole on one end for abutting one of the magnetic cores 15 and a south pole on the other end for abutting the other magnetic core 15.

In operation, the switch 10 may function by alternately pulsing one magnet or the other to form a north or south pole for attracting the slug 25 to one end or the other end of the switch and thusly interrupting one or another of the fiber optic paths.

The drive transistors 35, 41 create a magnetic field in the magnets 13 to create simultaneous north poles or simultaneous south poles at the airspace 16 core 15 interfaces. This creates an amplified effect upon the magnetic slug 25. The combination force of similar poles repelling and dissimilar poles attracting creates rapid movement of the slug 25 within the airspace 16. By simultaneously and complementarily activating the electromagnets 13 to provide complementary alternating electromagnetic fields resulting in same pole presentation at both ends of the magnetic slug 25 operating frequencies of 0–120 Hz can be achieved.

Many variations could be made in the above-described switch without departing from the scope thereof. For instance, the electromagnetic pole structure could be laddered creating a multi-channel switch having three or more magnets and two or more magnetic slugs.

The shape and material composition of the housing could be changed to any material which is non-magnetic whether it be transparent, translucent or opaque. The shape of the slug could be changed to fit the airspace guideway accordingly. Again, alternative permanently magnetic material, including magnetic rubbers and others may be substituted for the permaloy composition of the slug.

It is obvious to alter the size, shape and composition of the component parts of the switch as well as the strength of the electromagnetic fields created. By varying these parameters different operating characteristics are created for the switch. It is intended that all matter contained in the above description or shown in the accompanying drawings shall be interpreted as illustrative and not in the limiting sense.

What is claimed is:

1. A switch for interrupting one of a plurality of optical paths, comprising:
   a housing, said housing having a plurality of said optical paths therethrough;
   means for interrupting one of said optical paths while at least one of said optical paths is uninterrupted, said interrupting and uninterruption being a logical OR operation, said means having permanent magnetic properties and being slidably positioned within said housing; and
   means for alternately attracting and repulsing said interrupting means.

2. The switch of claim 1 wherein said interrupting means includes a permanently magnetized rectilinear slug member.

3. The switch of claim 2 wherein said slug member is free to move within said housing, said slug being oriented to have one of its poles pointing in one direction of movement and the other of its poles pointing in the opposite direction of movement.

4. The switch of claim 3 wherein said alternately attracting and repulsing means includes a pair of electromagnets.

5. The switch of claim 4 wherein said housing contains an elongate guideway and wherein said slug magnet is free to travel from one end of said guideway to the other end.

6. The switch of claim 5 wherein said pair of electromagnets are positioned on each end of said slug travel path in said guideway.

7. The switch of claim 6 wherein said pair of electromagnets are simultaneously and complementarily activated to provide alternating fields of magnetic force resulting in same pole presentation to both ends of said magnetic slug, said magnets being each connected to a current driver wherein driver operation is controlled by an output from a complementary outputted flip flop.

* * * * *

UNITED STATES PATENT AND TRADEMARK OFFICE
CERTIFICATE OF CORRECTION

PATENT NO. : 4,082,435
DATED : April 4, 1978
INVENTOR(S) : Vernon Zeitz

It is certified that error appears in the above—identified patent and that said Letters Patent are hereby corrected as shown below:

In Column 3, line 42, ---Q--- should read ---$\bar{Q}$---
In Column 3, line 43, ---Q--- should read ---$\bar{Q}$---
In Column 3, line 49, ---Q--- should read ---$\bar{Q}$---

Signed and Sealed this

Twenty-sixth Day of February 1980

[SEAL]

Attest:

SIDNEY A. DIAMOND

Attesting Officer     Commissioner of Patents and Trademarks